United States Patent
Kojima et al.

[11] Patent Number: 5,933,851
[45] Date of Patent: Aug. 3, 1999

[54] TIME-STAMP AND HASH-BASED FILE MODIFICATION MONITOR WITH MULTI-USER NOTIFICATION AND METHOD THEREOF

[75] Inventors: Kiyonobu Kojima; Naoki Fujisawa, both of Kanagawa, Japan

[73] Assignee: Sony Corporation, Tokyo, Japan

[21] Appl. No.: 08/721,894

[22] Filed: Sep. 27, 1996

[30] Foreign Application Priority Data

Sep. 29, 1995 [JP] Japan .................................. 7-252859

[51] Int. Cl.$^6$ .................................................. G06F 17/00
[52] U.S. Cl. .................................................... 711/133
[58] Field of Search .................................. 711/133, 134, 711/136

[56] References Cited

U.S. PATENT DOCUMENTS

| | | | |
|---|---|---|---|
| 5,109,486 | 4/1992 | Seymour | 395/200 |
| 5,287,504 | 2/1994 | Carpenter et al. | 395/600 |
| 5,291,598 | 3/1994 | Grundy | 395/650 |
| 5,745,669 | 4/1998 | Huggard et al. | 395/182.01 |

FOREIGN PATENT DOCUMENTS 4-337800  11/1992  Japan ............................. G09G 5/36

OTHER PUBLICATIONS

Crispin, Distributed Electronic Mail Models in IMAP4, Network Working Group, Request for Comments: 1733, p. 1, Dec. 1994.

*Primary Examiner*—Ellis B. Ramirez
*Attorney, Agent, or Firm*—Limbach & Limbach LLP; Seong-kun Oh

[57] ABSTRACT

An information management device includes a setter for setting an address of a file to be monitored, an accessor for accessing the address set by the setter at a prescribed timing, a determiner for determining updating of the file and a controller for controlling image display. The controller displays reduced images of home pages of the files to be monitored in the window of the display with the images being compressed in horizontal direction. The accessor then accesses the previously recorded addresses of the files to be monitored set by the setter at a prescribed timing and the determiner makes a determination as to whether or not the data of the accessed files are updated with reference to the dates of updating the files. When data of a file is determined to have been updated, the controller enlarges the reduced image corresponding to the updated file in the window so that the updating of the file can be quickly and surely recognized.

20 Claims, 16 Drawing Sheets

FIG. 13

| monitored files | |
|---|---|
| address | time |
| a | 9:00 every Monday |
| b | 23:00 every day |
| c | every hour |
| | |

TIME-STAMP AND HASH-BASED FILE MODIFICATION MONITOR WITH MULTI-USER NOTIFICATION AND METHOD THEREOF

BACKGROUND OF THE INVENTION

The present invention relates to an information management device and method, and more particularly relates to an information management device and method for monitoring in a quick and reliable manner whether or not a file has been updated.

FIG. 1 shows an example configuration of a related information management device. As shown in FIG. 1, each user terminal is connected to the various servers via a network such as a LAN (Local Area Network) or the Internet. The users then access servers as necessary and receive the desired information provided by the servers.

Information provided by each of the servers is updated as necessary. It is then necessary for each user to know whether or not files saved on each server have been updated. The following method is well known as a current method for letting the user know of file updating.

In a first method, each server keeps a list of users that access files that the server itself manages. Then, when a file is updated, data for the updated file is automatically transferred to the users listed.

In a second method, rather than transferring data for updated files to each other, a message showing that information has been updated is transferred from the server to each user via electronic mail.

Further, in a third method, each user accesses each server as necessary with whether or not a file has been updated being confirmed each time.

The first method, however, puts a load on each server and is difficult to realize when the number of users increases.

In the second method, the load on the server is reduced when compared with the first method because only messages are transferred, but even this puts management demands on the server that result in a large load.

Further, in the third method the user makes accesses as necessary. There is therefore a gap between the timing of the server updating the file and the file being received by the user and each user therefore cannot obtain the newest information.

As the present invention sets out to resolve these problems, the update conditions of files monitored by the users are to be made known in a rapid and reliable manner without putting a load on the server.

SUMMARY OF THE INVENTION

In order to resolve the above problems, according to the present invention, an information management device comprises a setter, accessor, determiner and controller. The setter is for setting an address of a file to be monitored. The accessor is for accessing the address set by the setter at a prescribed timing. The determiner is for determining the update status of the file. The controller is for controlling an image displaying updating conditions of the file in accordance with determination results for the determiner.

Further, the determiner can comprise a storage for storing the update time at the time of past accesses of the file and a comparer for comparing the update time stored in the storage and an update time at the time of a previous access of the file.

Moreover, the determiner can comprise a storage for storing a computed value obtained from computation with a hash function using data for the file at the time of a past access, and comparer for comparing the computed value stored in the storage with a computed value obtained from computation with the hash function using data for the file at the time of the previous access.

The setter can set a plurality of files as the files to be accessed and can further set a timing of accessing the files.

The controller can take a compressed image of an image for the files as an image showing the update conditions of the file.

The controller can provide a plurality of compressed images in one window respectively displaying update status for a plurality of files, and changes the rate of image compression for updated files from that for non-updated files.

The controller can also provide a plurality of images in one window respectively displaying update status for a plurality of files, and can change the color for updated files from that for non-updated files.

The controller can further adopt an error image when trouble accessing the file occurs.

The accessor can start to access a file when an image showing the update status of the file is designated.

Moreover, according to the present invention, an information management method comprises the steps of setting an address of a file to be monitored, accessing the set address for determining whether or not the file has been updated and displaying an image showing update status of the file in accordance with the determination results.

BRIEF DESCRIPTION OF THE DRAWINGS

FIG. 13 is a view illustrating the monitored file list;

DETAILED DESCRIPTION OF THE PREFERRED EMBODIMENTS

First Embodiment

Figure 1:
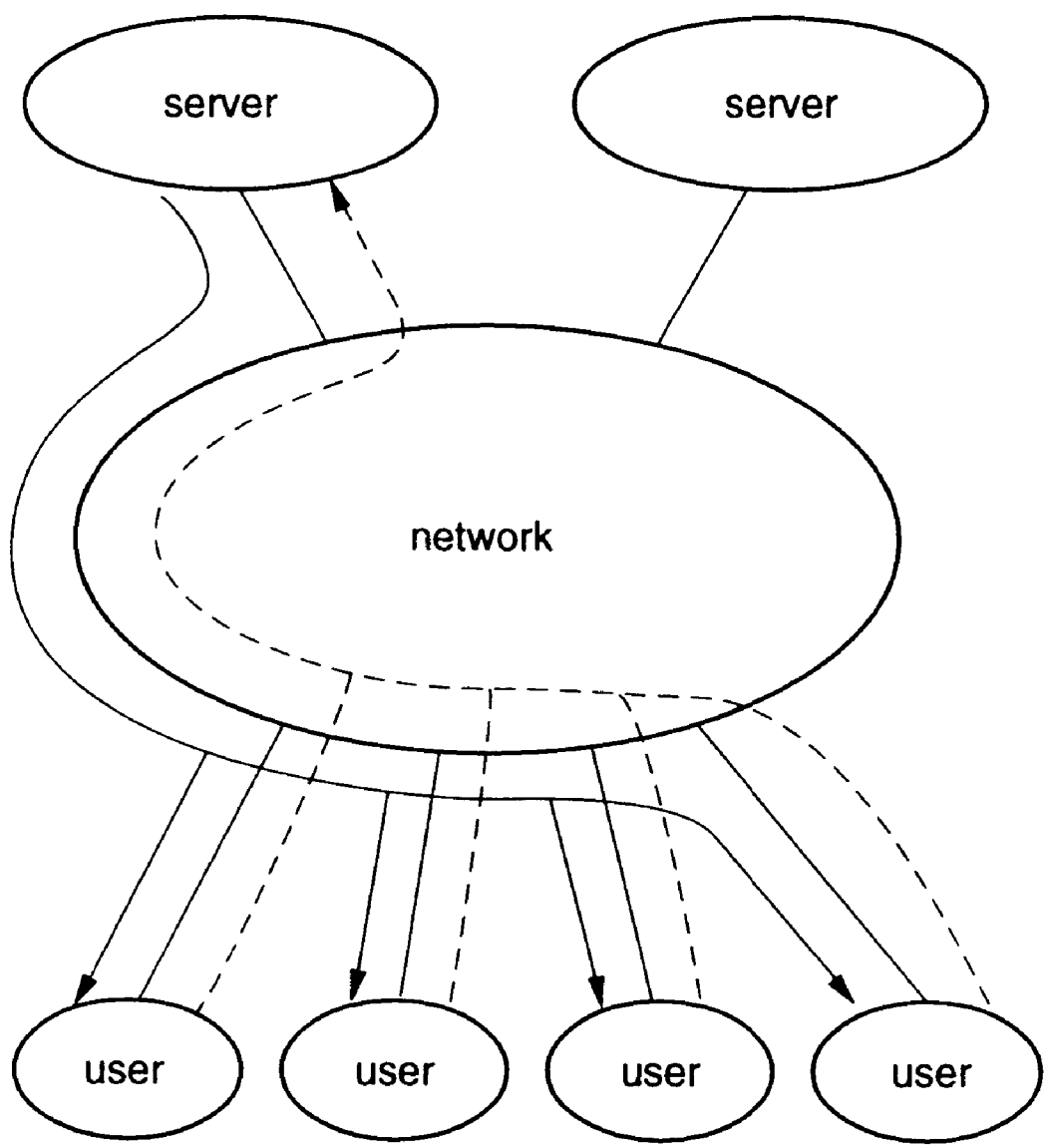
FIG. 1 is a view illustrating the current method of informing of file updates.
Figure 2:
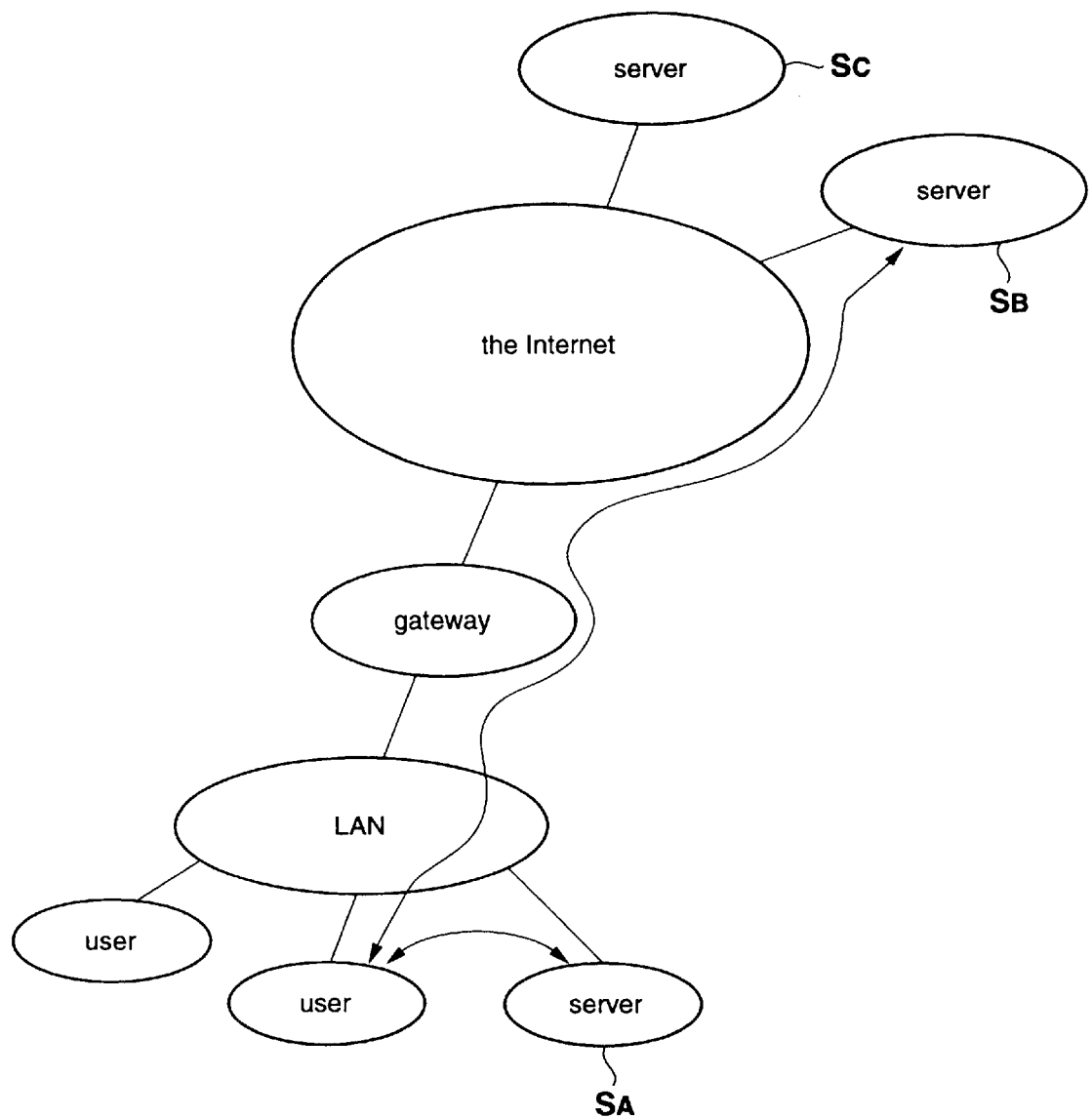
FIG. 2 illustrates a network connecting the information device of the present invention.

FIG. 2 shows an example of the configuration of the network connecting the information management device of the present invention. As shown in FIG. 2, a large number of servers or users are connected directly or via a LAN as a sub-network to the network of computers connected together on a worldwide scale known as the Internet. This example shows an in-house server SA and servers SB and SC that are not in a company. The user can then receive a variety of information and services provided by accessing prescribed servers as necessary.

Figure 3:
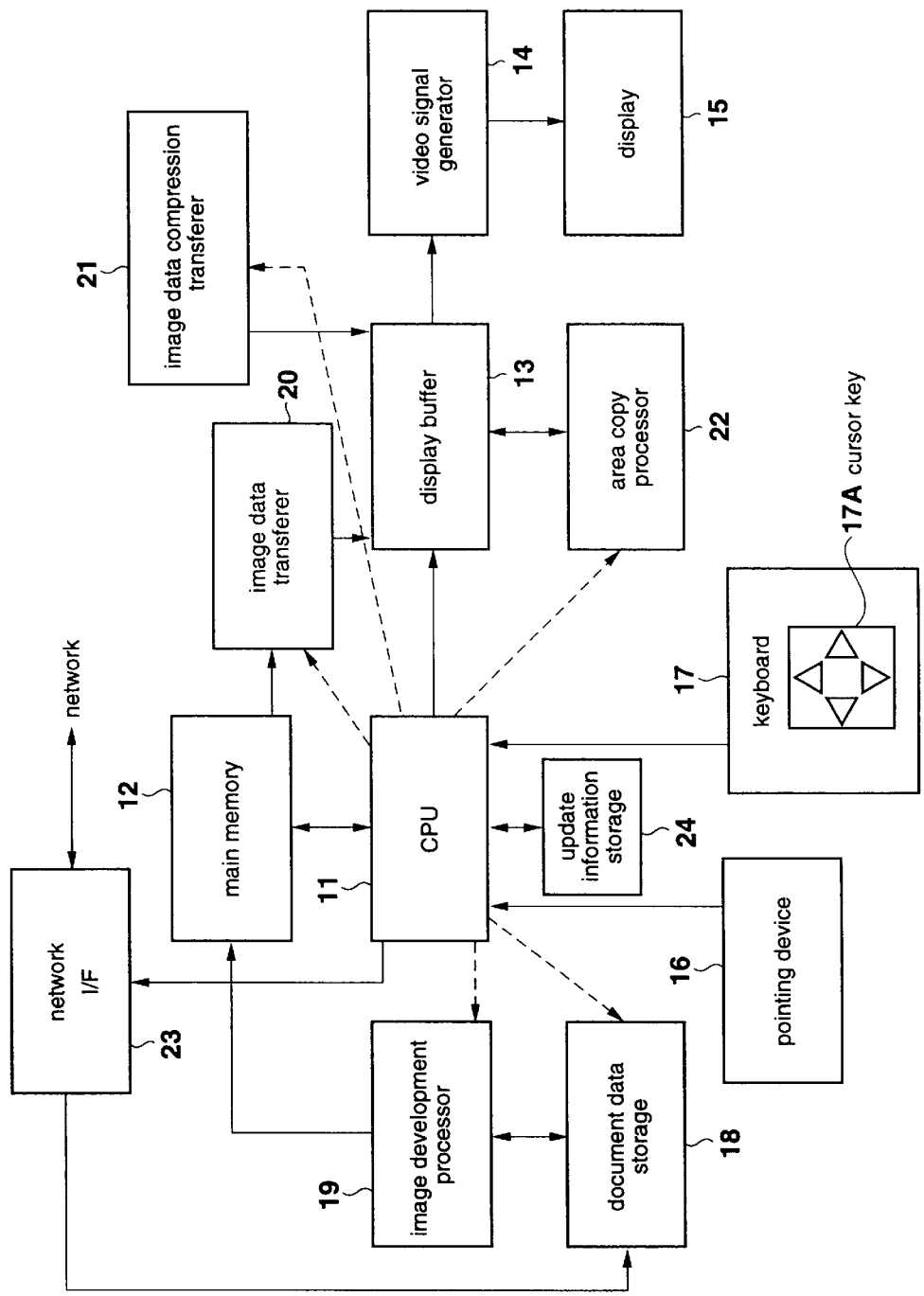
FIG. 3 is a block diagram showing the configuration of an embodiment of the information management device of the present invention.

FIG. 3 is a block diagram showing an example configuration of the information management device of the present invention. In this embodiment, a network interface (I/F) 23 receives data provided from the Internet and other networks and provides to and stores this data in a document data storage 18. In addition to being configured from a hard disc, optical disc or magneto-optical disc etc., the document data storage 18 can also be configured from a solid state memory, etc. The data stored in the document data storage 18 can be configured as hyper text description language such as HTML (Hyper Text Makeup Language), image data, compressed image data by MMR (modified modified READ) or MH (modified Huffman) etc., text data or page description language such as Postscript used in DTP etc.

An image development processor 19 develops data stored in the document data storage 18 into image data such as bit map corresponding to the data structure in accordance with instructions from a CPU 11 and outputs this to a main memory 12. When the data structure is image data compressed by MMR or MH etc. used in, for example, facsimiles etc., the image development processor 19 performs expansion processing. Further, if the image data is a page description language such as HTML and Postscript etc., the font is expanded and a raster image development process is carried out to perform page layout.

Data stored in the main memory 12 is provided to and stored in the display buffer 13 via an image data transferer 20 and an image data compression transferer 21. Basically, the image data transferer 20 transfers data stored in the main memory 12 to the display buffer 13 without modification and the image data compression transferer 21 compresses the image data stored in the main memory 12 and provides this image to the display buffer 13 to be stored therein.

The image data compression transferer 21 performs compression processing by transferring while thinning the data out every few lines or by reducing the number of lines while performing an operation such as a logical OR operation between lines. Alternatively, the number of image data dots is counted and compression processing is carried out in accordance with this number.

Further, the image data compression transferer 21 and the image data transferer 20 are capable of displaying without causing damage to fine characters even for displays of relatively low resolution by multivaluing binary image data when data read-out from the main memory 12 is transferred to the display buffer 13. However, in order to save time for the multivalued resolution transform processing, a rough image is first displayed, as disclosed in, for example, Japanese Laid-open Patent Publication Hei. 4-337800, with this data then being sequentially replaced afterwards with the multivalued data. The demands of speed of response and quality displaying are therefore both satisfied.

An area copy processor 22 executes a copying (shifting) process to copy part of image data stored in the display buffer 13 to another area of the display buffer 13.

A video signal generator 14 reads out image data stored in the display buffer 13, converts this image data to a video signal and outputs this data to a display 15 for displaying.

The update information storage 24 stores update information including the address of the server (file) which the user desires to observe, the time this observation started and the date for the previous update of the accessed file.

A keyboard 17 has at least cursor keys 17A operated by the user when various instructions are inputted to the CPU 11. Further, a pointing device 16 such as a mouse is operated by the user when designating a prescribed position using a cursor displayed on the display 15.

Figure 4:
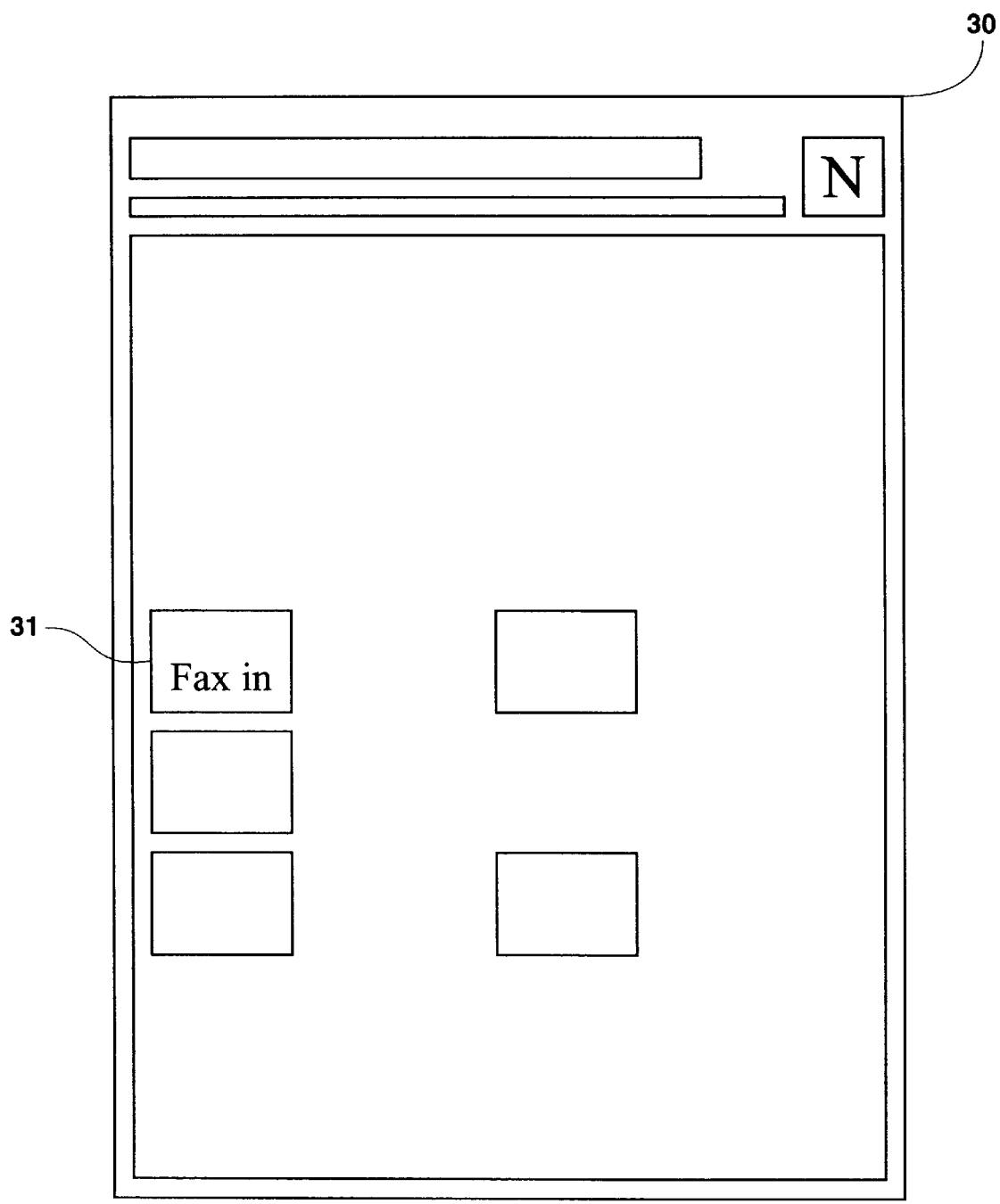
FIG. 4 is a view showing an example of the displaying of the menu.

Next, the operation of the embodiment of FIG. 3 is described. When the keyboard 17 is operated and the CPU 11 gives an instruction to start accessing, for example, the Internet, the CPU 11 displays such menu picture as is shown, in FIG. 4 on the display 15. Icons for accessing various servers connected to the Internet are displayed in this menu picture.

When the user designates and selects, for example, a "Fax in" icon 31 using the cursor, the CPU 11 controls the network interface 23 to access the server which is connected to the Internet and corresponds to the "Fax in" icon 31. The server stores image data transmitted from outside and received with a Fax receiver circuit or image data (bitmap data) picked up from cuttings of newspapers and magazines with an image scanner by using software such as HTML editor, and is used for carrying out the service (Fax in service) of providing the data.

The network interface 23 provides data provided from servers accessed via the Internet to the document data storage 18, where the data is stored. Part of this data is then provided to the image development processor 19 where the data undergoes expansion processing, is converted to bitmap data, and is provided to the main memory 12 to be stored.

Figure 5:
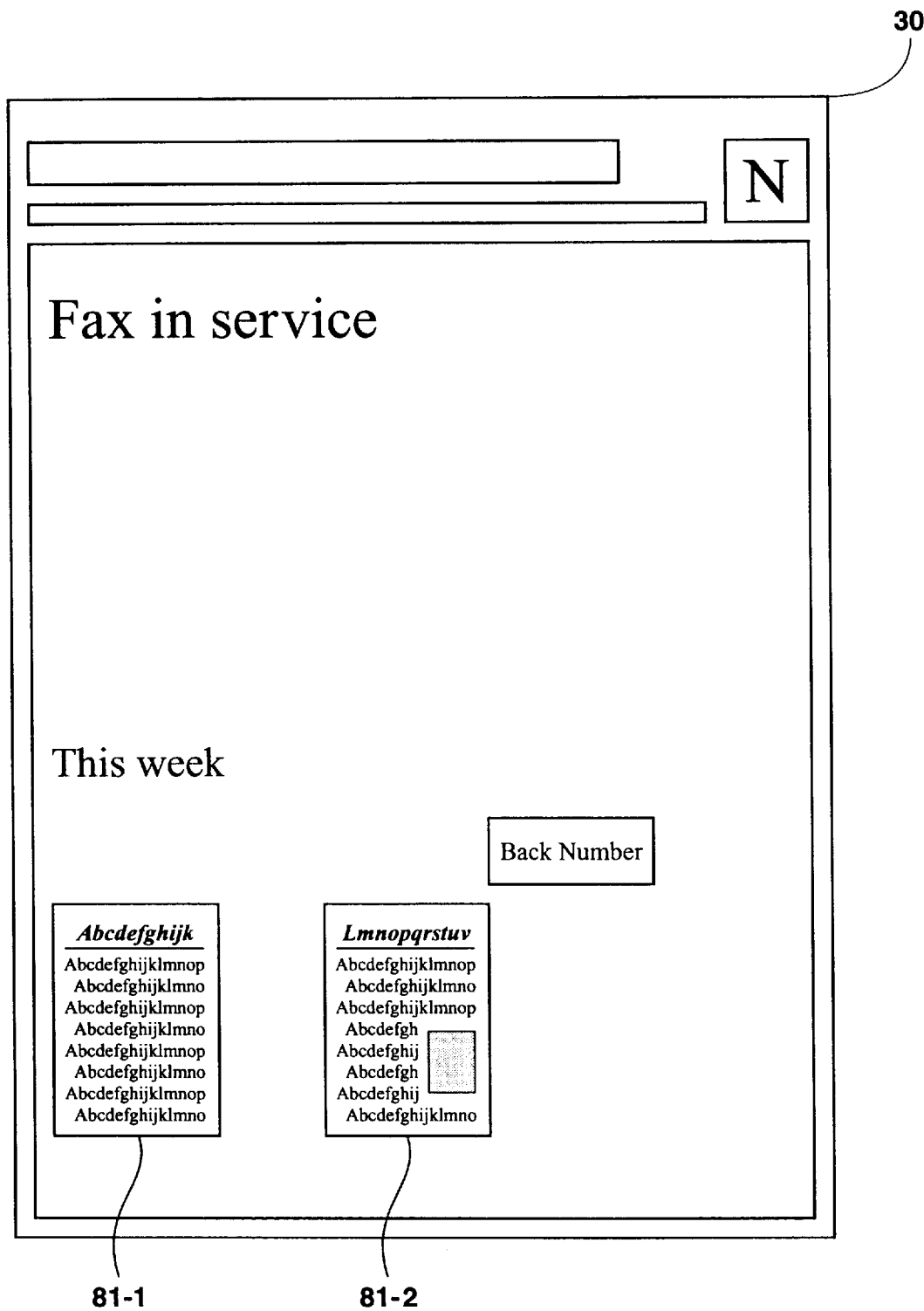
FIG. 5 is a view showing an example of the displaying of the home page.

Data stored at the main memory 12 is provided to and written to the display buffer 13 via the image data transferer 20. Data written to the display buffer 13 is provided to the video signal generator 14, converted to a video signal, provided to the display 15 and displayed. In this way, home page of the accessed server, for example, as shown in FIG. 5 is initially displayed at the display 15.

When a user then operates the pointing device 16 or keyboard 17 while watching the home page so as to give an instruction for the selection of, for example, a file 81-2 for a cutting of newspaper, the CPU 11 makes a request to the server for transfer of data via the network interface 23 when the data for the file is not yet stored in the document data storage 18. When the server transfers the data in response to this request, this data is supplied to the document data storage 18 via the network interface 23 and stored.

Next, the CPU 11 reads out the data (document data) for the file stored in the document data storage 18 and supplies this data to the main memory 12 for storing therein after the data is converted to bitmap data by the image development processor 19. This data is then provided to and stored in the display buffer 13 via the image data transferer 20 or the image data compression transferer 21. One page of image data written to the display buffer 13 is then supplied to the video signal generator 14, converted to a video signal, outputted to the display 15 and displayed.

Figure 6:
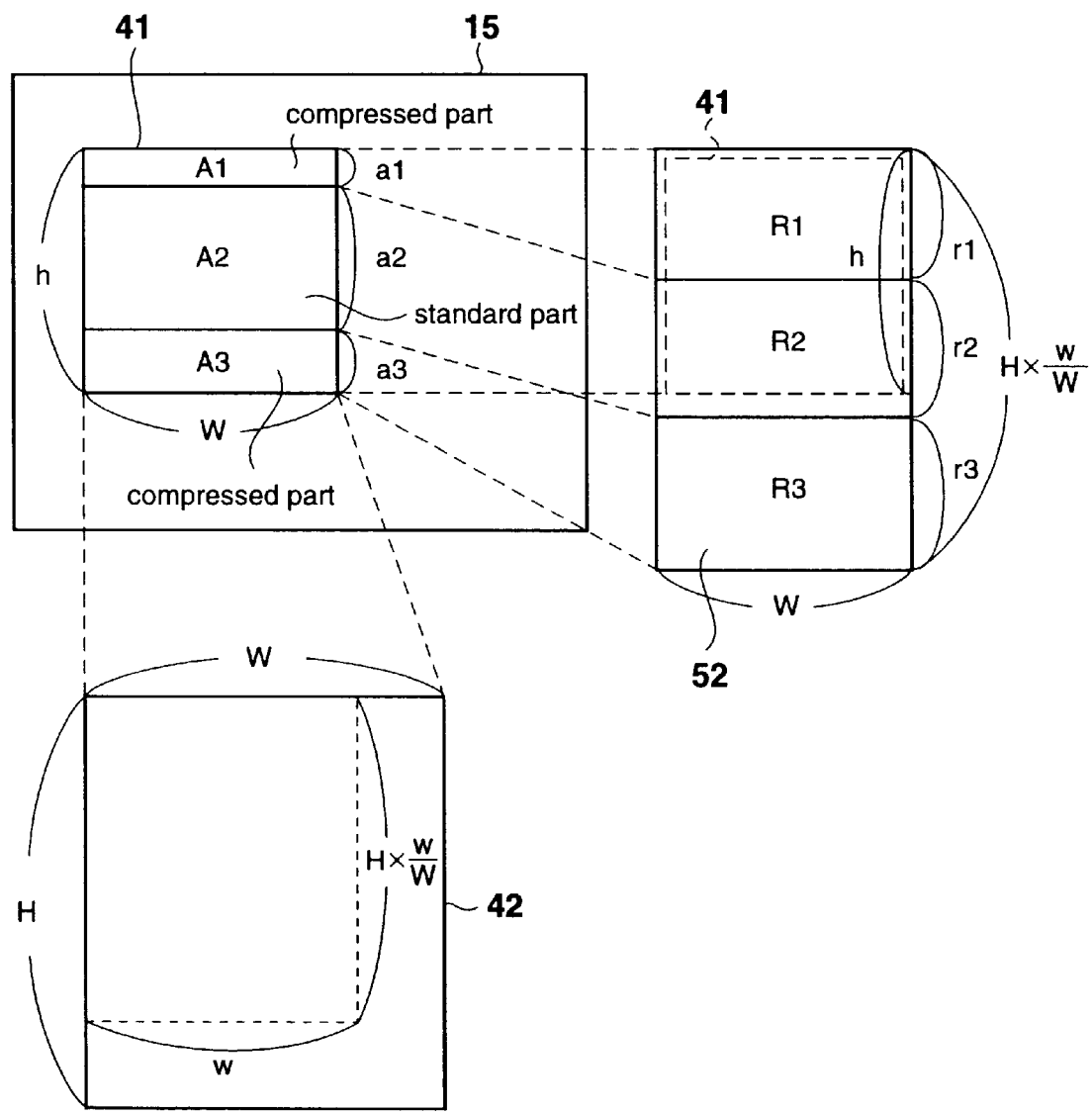
FIG. 6 is a view showing the principle of displaying in the present invention.

Next, the theory for displaying a one-page image is described with reference to FIG. 6. Suppose that the window 41 is displayed at the display 15, with an image of the cutting of the newspaper article of the size of one page of A4 read from the document data storage 18 being displayed in the window 41. The image data 42 for the one page of image stored in the main memory 12 is taken to have a width W and a height H, as shown in FIG. 6.

The window 41, however, has a width w and a height h, with the width W and height H of the image data 42 being taken to be larger than the width w and height h of the window 41. In this case, the whole of the image data 42 cannot be displayed in the window 41 as it is. In this embodiment, processing is then carried out so as to fit (adjust), for example, the width W of the image data 42 with the width w of the window 41, i.e. the width and the height of the image data 42 is compressed overall by a compression ratio of w/W.

However, because the height h of the window 41 is smaller than the height Hx(w/W) of the image data 52 thus overall compressed by w/W in both directions of the width and the height, the image data 52 is further compressed in the direction of the height as follows. Namely, the window 41 is divided into a region $A_2$ of height $a_2$, for example, 70% of the height h of the window 41, a region $A_1$ of height $a_1$, above the region $A_2$ and a region $A_3$ of height $a_3$ below the region $A_2$. The image data 50 is also divided into regions corresponding to these portions, a region $R_2$ of height $r_2$ ($=a_2$), a region $R_1$ of height $r_1$ above $R_2$ and a region $R_3$ of height $r_3$ below $r_2$.

The data for the region $R_2$ of the image data 52 is then transferred to as it is (without compression) and displayed at the region $A_2$ of the window 41. With regards to this, the data for the region $R_1$ is compressed in the longitudinal direction, transferred to the region $A_3$ and displayed. The height $a_2$ of the region $A_2$ is taken to be a value which is 70% of the height h of the window 41 and the height $r_2$ of the region $R_2$ of the image data 52 is taken to be a value which is the same as $a_2$. The regions $A_1$ and $A_3$ are therefore taken as compressed parts displayed with displayed characters therein compressed in the longitudinal direction with respect to the region $A_2$ taken as a standard part with characters therein displayed in correct ratio (the ratio of the longitudinal and horizontal directions).

Figure 7:
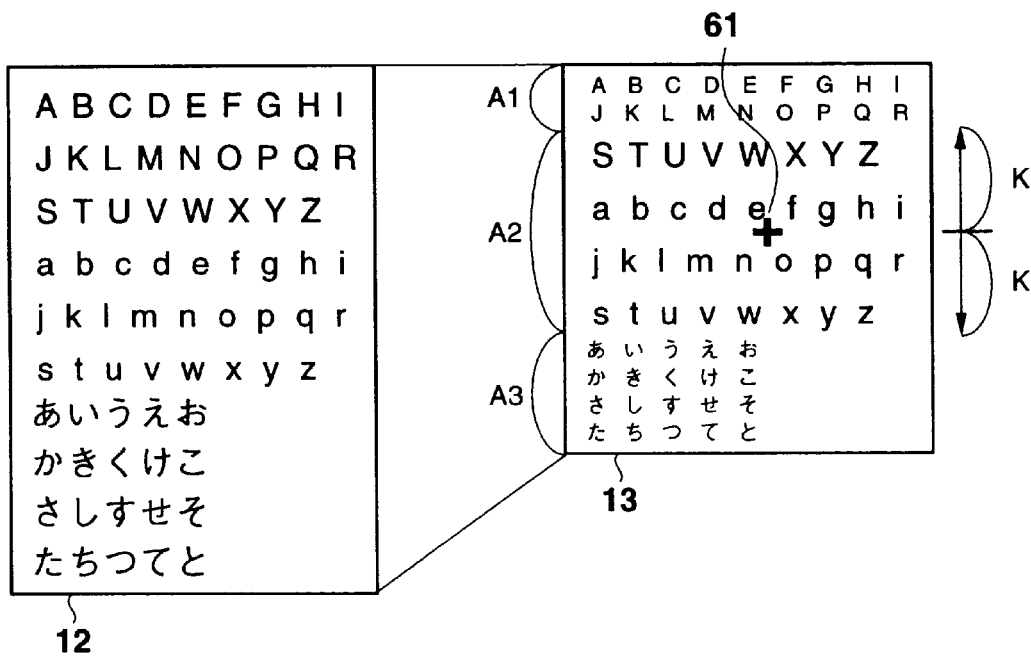
FIG. 7 is a view illustrating the relationship between the cursor position and the range of display of the present invention.
Figure 8:
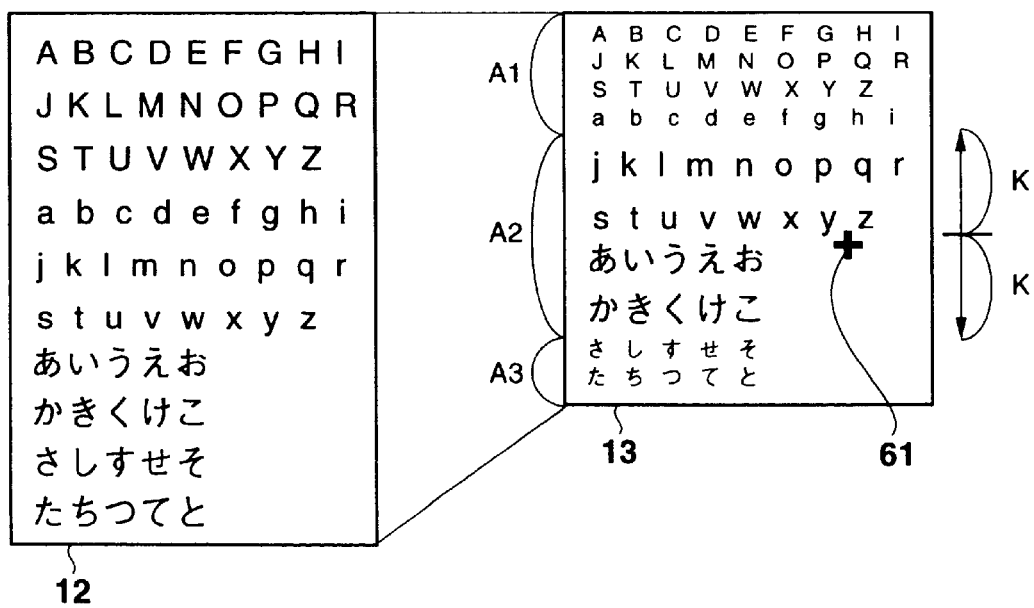
FIG. 8 is a view illustrating the range of displaying in the present invention when the cursor position is shifted.

The position of the region $A_2$ of the standard part can be shifted using the cursor. FIG. 7 and FIG. 8 show this relationship. Namely, as shown in FIG. 7, the range going up as far as K and down as far as K is taken as the region $A_2$ of the standard part taking the position of the cursor 61 for the display buffer 13 (therefore the window 41) as center, with the regions above and below being taken as $A_1$ and $A_3$. Therefore, when the cursor 61 is shifted downwards from, for example, the position as shown in FIG. 7, the region $A_2$ of the standard part shifts downwards, as shown in FIG. 8, from the position in FIG. 7. As a result, the range of the region $A_1$ is enlarged more in the case of FIG. 8 than in the case of FIG. 7 and the range of the region $A_3$ becomes narrower in the case of FIG. 8 than in the case of FIG. 7.

Figure 10:
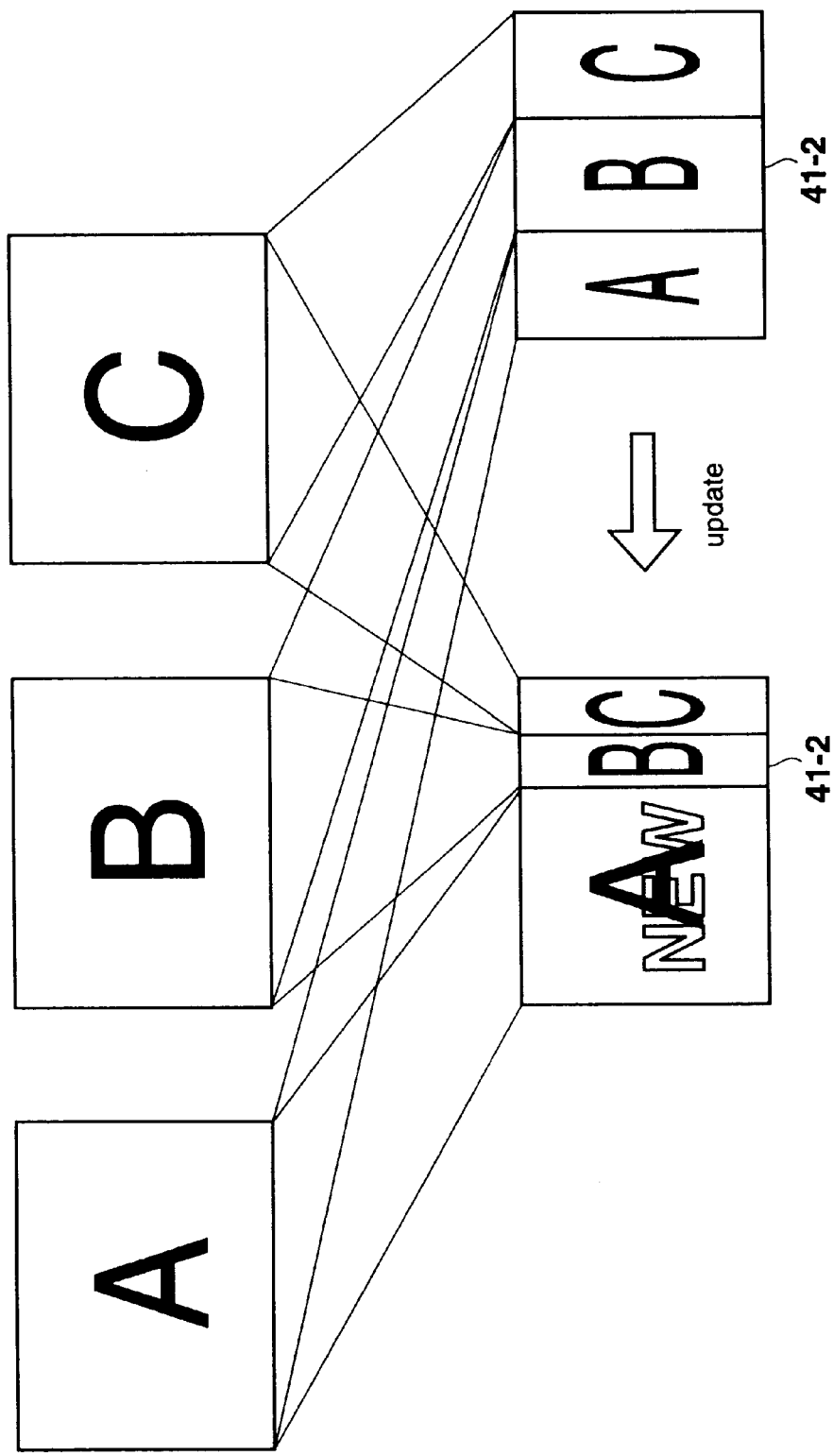
FIG. 10 is a view illustrating the compression of the window 41-2 of FIG. 9.
Figure 11:
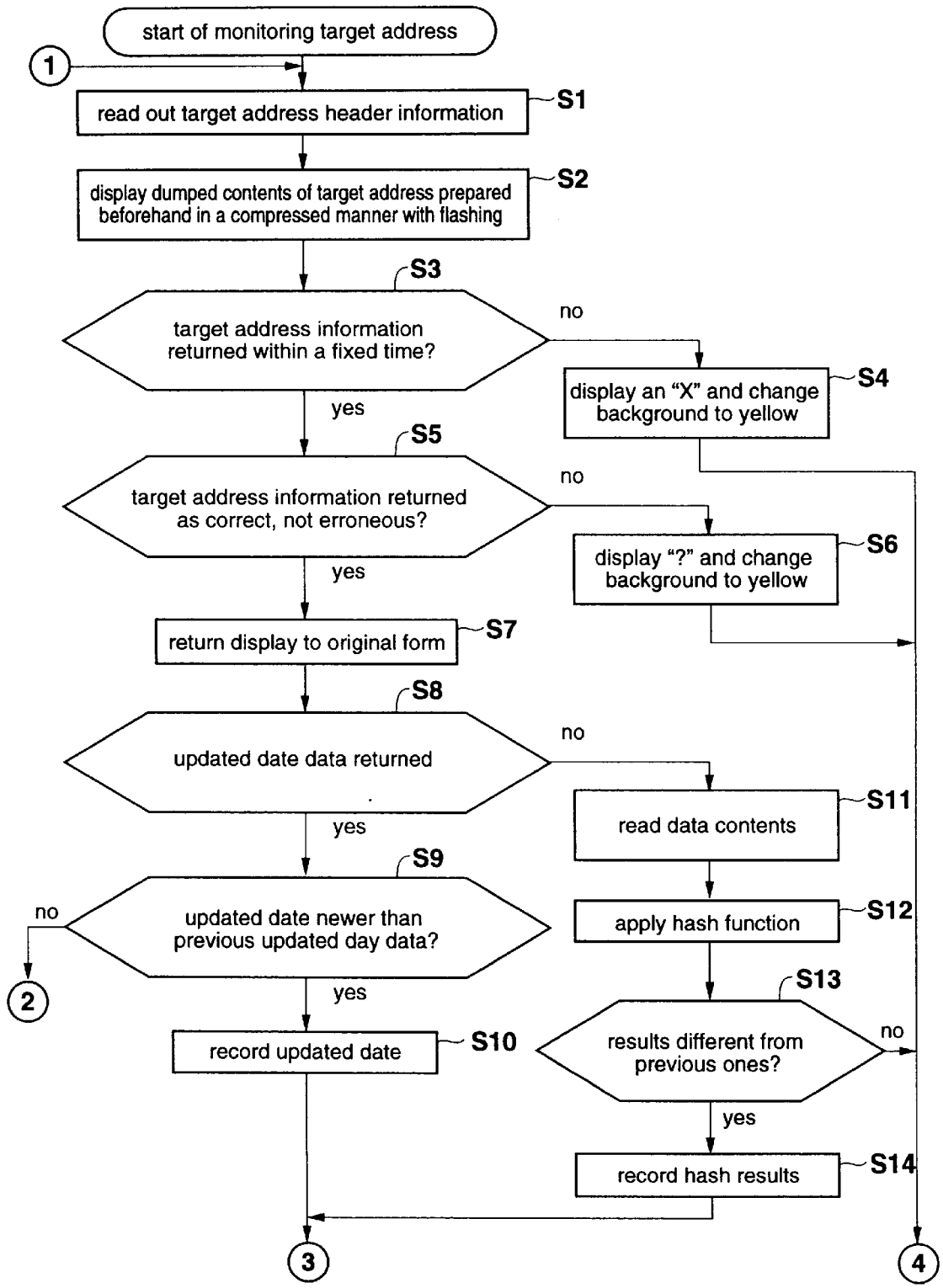
FIG. 11 is a flowchart illustrating the operation of the embodiment of FIG. 3.
Figure 12:
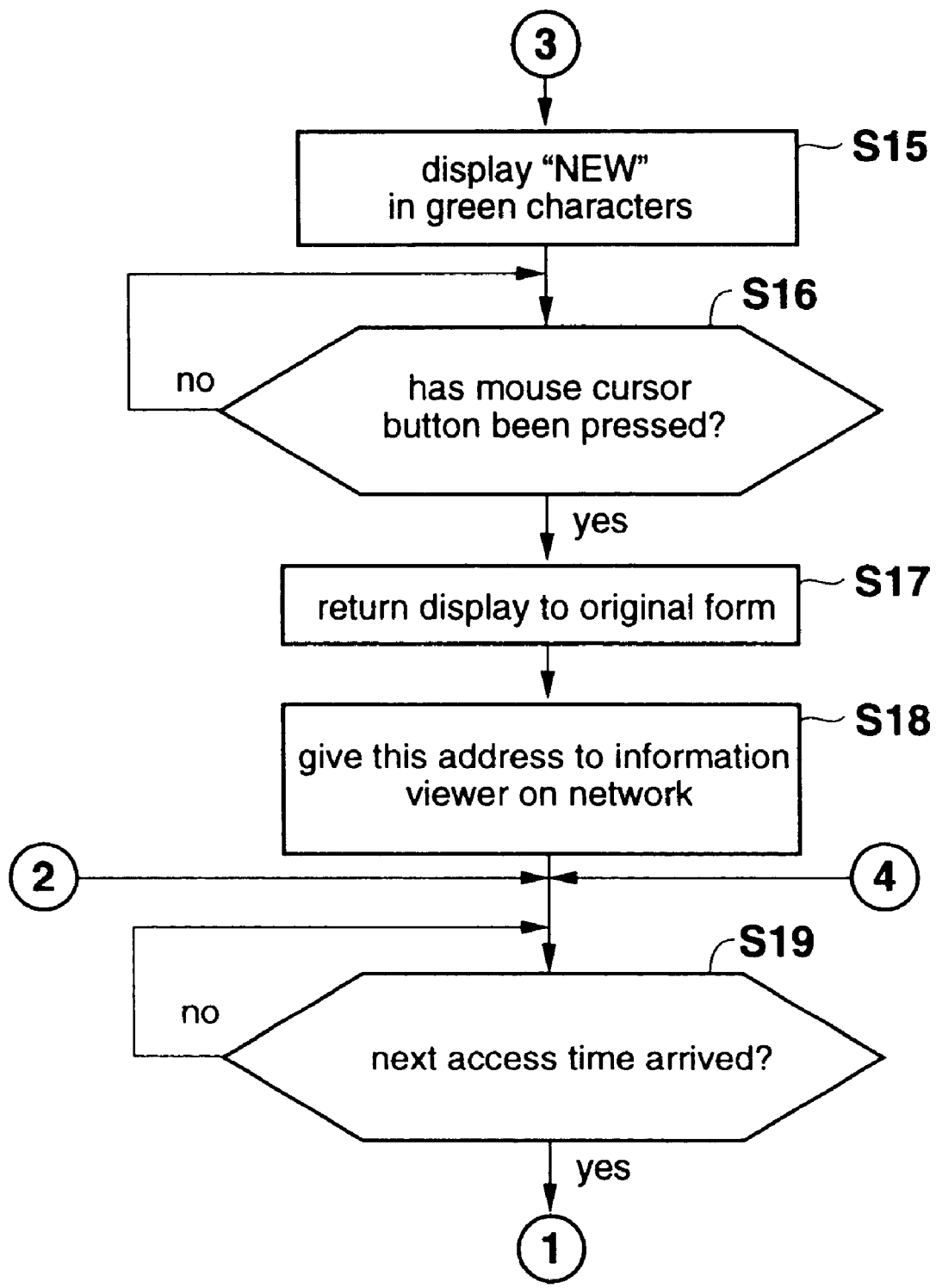
FIG. 12 is a continuation of the flowchart of FIG. 11.

Next, a description is given with regards to the file monitoring method of the present invention with reference to the flowcharts of FIG. 11 and FIG. 12. But first, a description is given of the image expressing the update status of the file being monitored with reference to FIG. 9 and FIG. 10.

Figure 9:
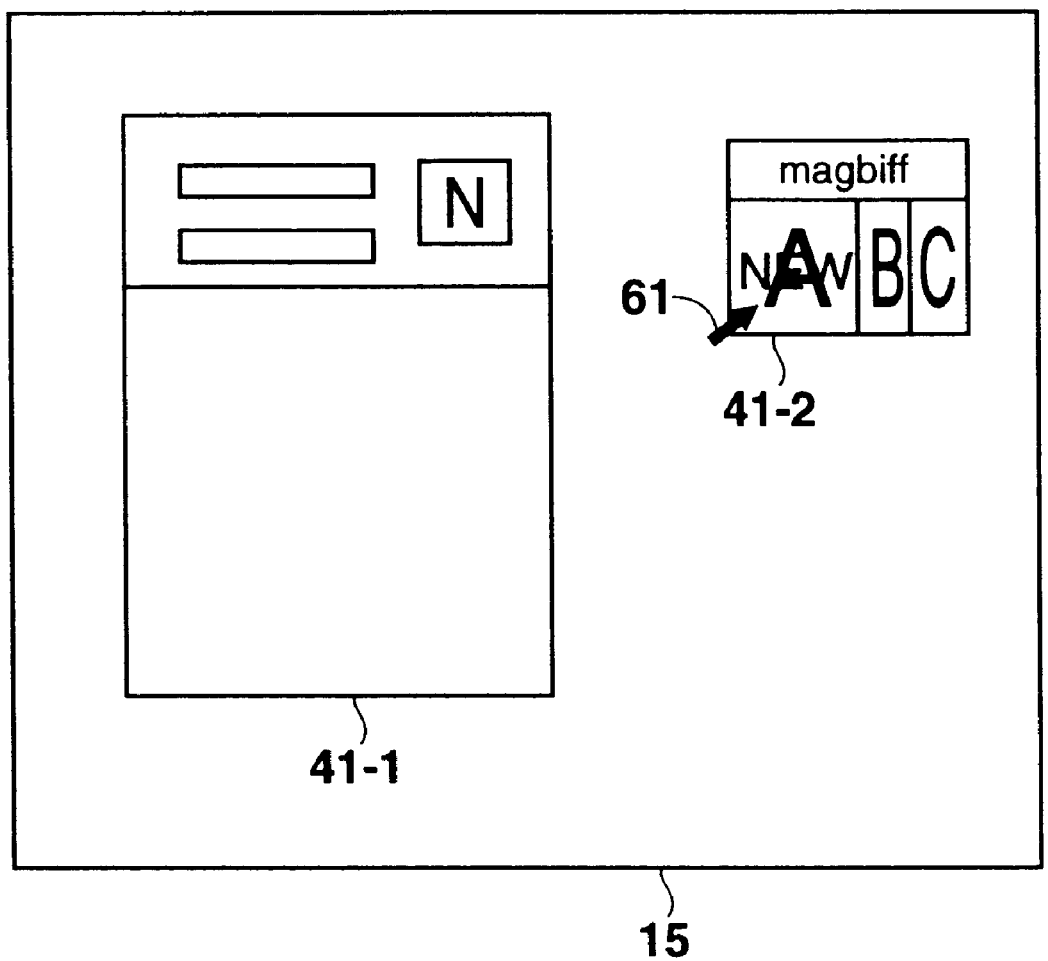
FIG. 9 is a view showing the principle of displaying the image showing the update status of the file.

In this embodiment, as shown in FIG. 9, an image displaying a plurality of file update status is displayed at a separate comparatively small window 41-2 at the display 15 when the image for the task being processed at this time is being displayed at the window 41-1.

FIG. 10 shows an enlargement of this window 41-2 being taken as is monitoring, for example, three file update status. At this time, as shown in the window 41-2 on the right side of FIG. 10, the image (shown by A, B and C in FIG. 10) of, for example, the home page of the file being monitored is reduced, the reduced image being compressed in the horizontal direction and displayed.

Each file is then accessed at the designated timing and a determination is made as to whether or not this file has been updated. When this file has been updated, as shown in the window 41-2 of the left side of FIG. 10, the image for the home page of this file is displayed in an enlarged form compared with the image of the file that has not been updated. As a result, updating of files being monitored by each user can be known rapidly and accurately.

Next, the method of monitoring the files is described with reference to the flowcharts of FIG. 11 and FIG. 12. Before the processes shown in FIG. 11 and FIG. 12 start, the user operates the keyboard 17 or the pointing device 16 to execute a process to record the address of the file to be monitored. When this input operation is carried out, the CPU 11 stores this input information in an update information storage 24.

FIG. 13 schematically shows the monitored file list stored at the update information storage 24 in this way. In this embodiment, information is listed with respect to the addresses a, b and c of the three files A, B and C and the time these addresses are to be accessed. The files to be listed here can be a plurality of files for managing a single server (for example, the server $S_A$ of FIG. 2) or files (files A, B and C) for managing different servers (for example, servers $S_A$, $S_B$ and $S_C$ of FIG. 2), with the latter example being adopted in this embodiment. As shown in FIG. 13, this time information for intended accesses can be designated by a time and a day, such as "9:00 every Monday", just by a time, such as "23:00 every day" 23:00, or by a period, such as "every hour".

The processes shown in FIG. 11 and FIG. 12 are carried out with respect to the addresses of files pre-listed in this way.

In step S1 of FIG. 11, the CPU 11 reads out the address (for example, address a) of a file stored in the update information storage 24, controls the network interface 23 and starts accessing this address. As a result, for example, accessing the server $S_A$ show in FIG. 2 is carried out.

Figure 14:
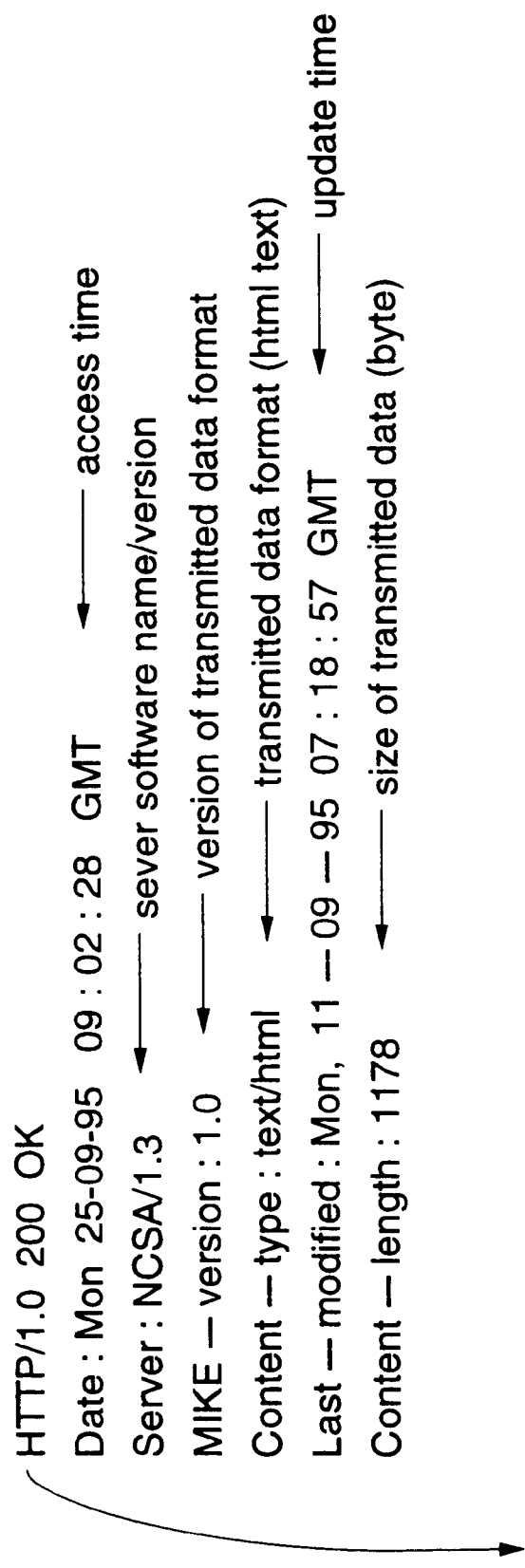
FIG. 14 is a view illustrating the header information.

At this time, the server which has been accessed provides header information to the user, as shown, for example, in FIG. 14, with the CPU 11 receiving this header information via the network interface 23.

In addition to the communications protocol name (HTTP), the version (1.0) thereof and the communications status (20 OK), this header information also includes the date and time of updating this file (Mon, Nov. 9, 1995 07:18:57 GMT) and so on.

When the CPU 11 has accessed a prescribed file (server) in this way, the process proceeds to step S2 where the image (for example, a home page image) displaying the contents of the file prepared beforehand in the document data storage 18 is reduced, further compressed in the horizontal direction and displayed at the window 41-2 on the right side of FIG. 10. The image is then flashed on and off. In this case, for example, the image for the displayed file A with the additional character A of the right-side window 41-2 shown in FIG. 10 is displayed flashing on and off. As a result, the user is made aware that an access is being carried out with respect to file A and that the update status are being confirmed.

Next, the process proceeds to step S3 and a determination is made as to whether or not the accessed address information has been returned in a fixed period of time. When information relating to this file has not been transmitted after the access has started even after a fixed period of time, the process proceeds to step S4 and an "x" mark is overlaid on the reduced image for the file. The background color of this "x" mark is changed to be a different color (for example, yellow) from the normal background color (for example, white).

Figure 15:
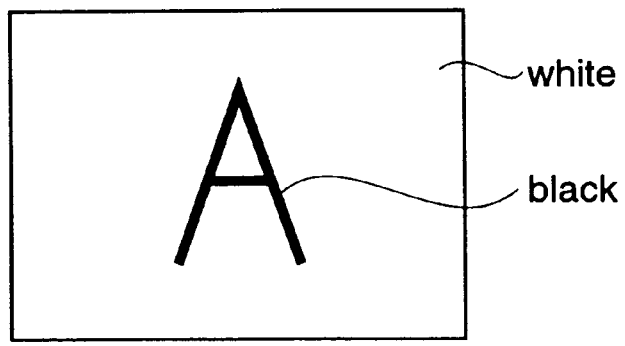
FIG. 15 is a view illustrating the original compressed image.
Figure 16:
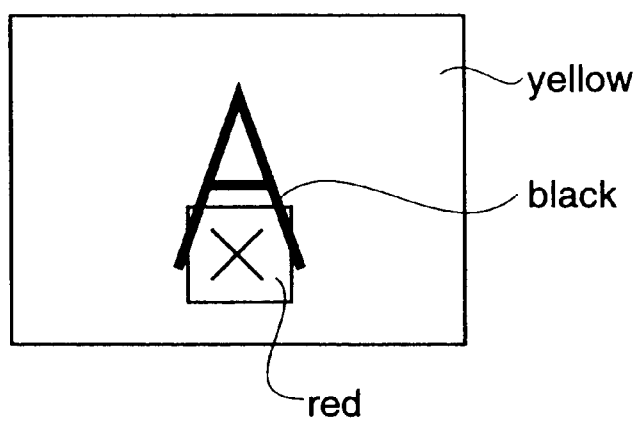
FIG. 16 is a view showing an example display occurring in step S4 of FIG. 11.

For example, when a reduced image for the home page for the file A displayed in the window 41-2 is expressed as black characters on a white background, as shown in FIG. 15, the background is made yellow and a red "x" mark is superimposed and displayed, as shown in FIG. 16. In FIG. 15 and FIG. 16, for convenience, the reduced home page is shown without being compressed in the horizontal direction but in reality, as shown in FIG. 10, this displaying is performed with compression in the horizontal direction. This image is difficult to recognize because of compression in the horizontal direction but the difficulty can be reduced by the "x" mark being displayed in a comparatively large manner. Further, because the background color has been changed to yellow from the normal white, the existence of problem on the network such as, for example, cutting of the communications line or failure of the power supply of the accessed server can be found out from this change in color.

After step S4, the process proceeds to step S19 and the arrival of the next access time is waited for. When the next access time arrives, the process is returned to step S1 and the process thereafter is repeated.

On the other hand, when it is determined in step S3 that information from the accessed server has returned within a fixed time, the process proceeds to step S5 and a determination is made as to whether this information is correct or not. If this information is erroneous, the process proceeds to step S6, a "?" mark is added to the reduced image and the background color of the reduced picture is changed to yellow.

Figure 17:
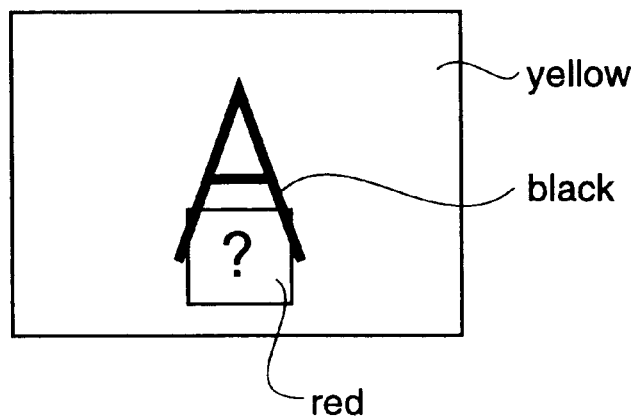
FIG. 17 is a view showing an example display occurring in step S6 of FIG. 11.

As shown, for example, in FIG. 17, the background color is changed to yellow with a red "?" being superimposed and displayed. This image is compressed in the horizontal direction in the same way as the case for step S4 and displayed in the window 41-2 on the right side of FIG. 10.

The process then also proceeds to step S19 when carrying out displaying in this way and the arrival of the next access time is waited for. When this time arrives, the process is returned to step S1 and the process thereafter is again repeated.

On the other hand, in step S5, when it is determined that correct information has been transmitted from the accessed server, the process proceeds to step S7 and the reduced image flashed on and off and displayed in step S7 is return to its original state, i.e. flashing is halted. Then the process proceeds to step S8 and a determination is made as to whether or not the header information includes updated date data. Namely, some servers do not transmit the updated date back and a determination as to whether or not the updated date has been transmitted is therefore also carried out.

When it is determined that updated date data has been transmitted back, the step proceeds to step S9 and a determination is made as to whether or not the updated date data read out at present is newer than the updated date of accesses of the previous time (or beforehand). In the case of an initial access, the updated date data for this time is taken as the newest data because a previous updated date does not exist. In this case, the process proceeds to step S10 and the updated date is stored in the update information storage 24.

In the case from the second access onwards, if the updated date of the current access is newer than the updated date of a past access stored in the update information storage 24, the newer updated date is then converted to the newest updated date in step S10.

The process then proceeds to step S15 and the characters "NEW" are superimposed on the reduced image showing the update status and the characters are displayed in green. Further, this reduced image is displayed with a size being enlarged compared with that of the reduced image in the case without updating.

Figure 18:
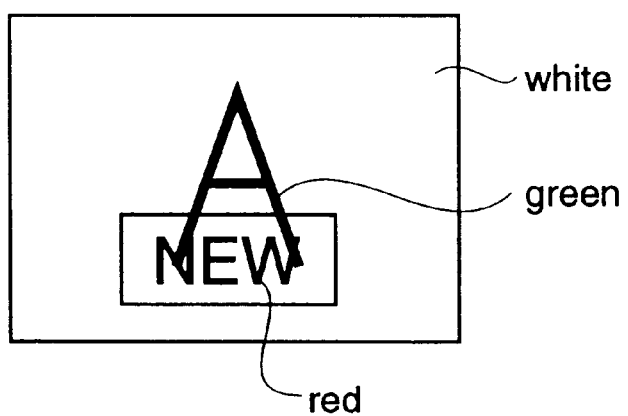
FIG. 18 is a view showing an example of display for step S15 of FIG. 12.

As shown with an example illustrated in FIG. 18, the color of the characters displayed on a white background in black is converted to green and the characters "NEW" are superimposed in red. This reduced image is then displayed larger than the reduced images for other files (B, C) which have not been updated as shown in the window 41-2 on the left side of FIG. 10. When the accessing of file A starts from the situation for which the display provides the compressed image for the three files A, B and C being compressed to have the same width in the horizontal direction as shown in the window 41-2 on the right side of FIG. 10, the compressed image for file A is flashed on and off. When updating of file A is then confirmed, the image of file A is displayed larger (with a smaller rate of compression in the horizontal direction), as shown in the window 41-2 on the left side of FIG. 10. Images for the remaining files B and C are then displayed with a larger rate of compression (with narrower width) than that in the case for the right-side window 41-2. The character for file A is then made green and large red characters "NEW" is superimposed. The user can therefore be made aware of updating of file A.

When the user is thus made aware of the updating of the file, he is able to access the file merely by carrying out an operation to simply designate this reduced image without starting accessing operation again from the beginning.

Namely, as shown with an example illustrated in FIG. 9, the cursor (mouse cursor) 61 for the pointing device 16 is shifted on the reduced picture of file A of window 41-2 and the mouse is clicked on this position.

In step S16 of the process, the CPU 11 waits for such button click of the mouse. When a click comes, the process proceeds to step S17 in which the display in the window 41-2 is returned to its original state, i.e. the conditions displayed in the window 41-2 on the left-side of FIG. 10 are changed to the conditions shown in the window 41-2 on the right-side.

The process then proceeds to step S18 and the CPU 11 sends the address to the information viewer (for example, Netscape Navigator (trademark) taken as a browser for, for example, the WWW (World Wide Web) on the network. In this embodiment, the reduced image in the window 41-2 is linked to the address for the file.

Then the process proceeds to step S19 for the next access. When the time for the next access comes, the process returns to step S1 again and the process from thereafter is repeated again.

On the other hand, in step S18, when the address for file A is passed over, the viewer accesses this address, i.e. in the current case, accessing of file A commences. Information for the updated file A can then be provided from the server 1.

In step S9, the updated date obtained as a result of the access this time is stored in the update information storage 24. When this updated date is determined to be the same as the updated date for the previous time or beforehand, the recesses for step S10 and S15 to S18 are skipped and the process proceeds to step S19 to wait for the time for the next access.

Further, as described above, some servers do not transmit back the data for the updated date of the file even though servers are accessed. In this case, as in the following, a hash function is utilized and a determination is made as to whether or not the file has been updated.

Namely, in step S8, when it is determined that the updated day data has not been sent back, the process proceeds to step S11 and the CPU 11 makes a request to the server for the transfer of data for the file currently being accessed. The data for this file is then provided by the server. Next, the process proceeds to step S12 and the CPU 11 multiplies the file data (all of the data) provided by the server with the prescribed hash function.

For simplicity, let's take the file data to be text data comprising, for example, n characters $A_1, A_2, A_3, \ldots A_n$. By using the three characters in the text data, the first character $A_1$, the intermediate character $A_{n/2}$ and the second character $A_{n-1}$ from the end of the text data, the following hash function is then defined for the data comprising n characters $A_1, A_2, A_3, \ldots A_n$.

hash $(A_1 A_2 \ldots A_n)$
$= (A_1 + A_{n/2} \times 26 + A_{n-1} \times 26^2)$ mod 1000

When the received data is text data for, for example, "SUZUKI", the following operation is performed.

$$\text{hash (SUZUKI)} = \{ASC(`S`) - ASC(`A`) +$$
$$(ASC(`Z`) - ASC(`A`)) \times 26 +$$
$$(ASC(`K`) - ASC(`A`)) \times 26^2\} \text{mod } 1000$$
$$= (18 + 650 + 6760) \text{mod } 1000 = 428$$

By computing the hash function in this way, the data "SUZUKI" can be made to correspond to the numeric value 428.

The computed value obtained by computing the hash function provides different value for the different original data with a high provability. The updating of the data (the data being different from past data) for this file can therefore be made known from the computed value of the hash function.

Then, in step S13, the computed value with the hash function obtained in step S12 is compared with the computed value in the past stored in the update information storage 24. When these computed values do not coincide, the process proceeds the step S14 and the computed value with the hash function currently obtained in step S12 is stored in the update information storage 24. This means that the file has been updated because the currently computed value is different from the computed value in the past. In this case, the process proceeds to step S15 and executes processes so as to superimpose and display the characters "NEW" on the reduced image.

However, when the computed value with the hash function obtained and stored previously and the computed value obtained on this occasion are equal, this means that the file data has not been updated. In this case, the process then proceeds to step S10 for the time of the following access. When this access time arrives, the process is returned to step S1 and the process thereafter is again repeated.

By doing the above, update status for files managed by servers which do not send back the updated data can be made known.

As described above, when, for example, the server $S_A$ of FIG. 2 is accessed, the same process is next carried out for the server $S_B$ managing the file B listed in the monitored file list and the server $S_C$ managing the file C at the listed times.

The timing of accessing each file can be arbitrarily set by the user. The file updating conditions can therefore be made known to the user at the frequency (at an arbitrary timing perceived as being in real-time by the user) desired by the user.

Figure 19:
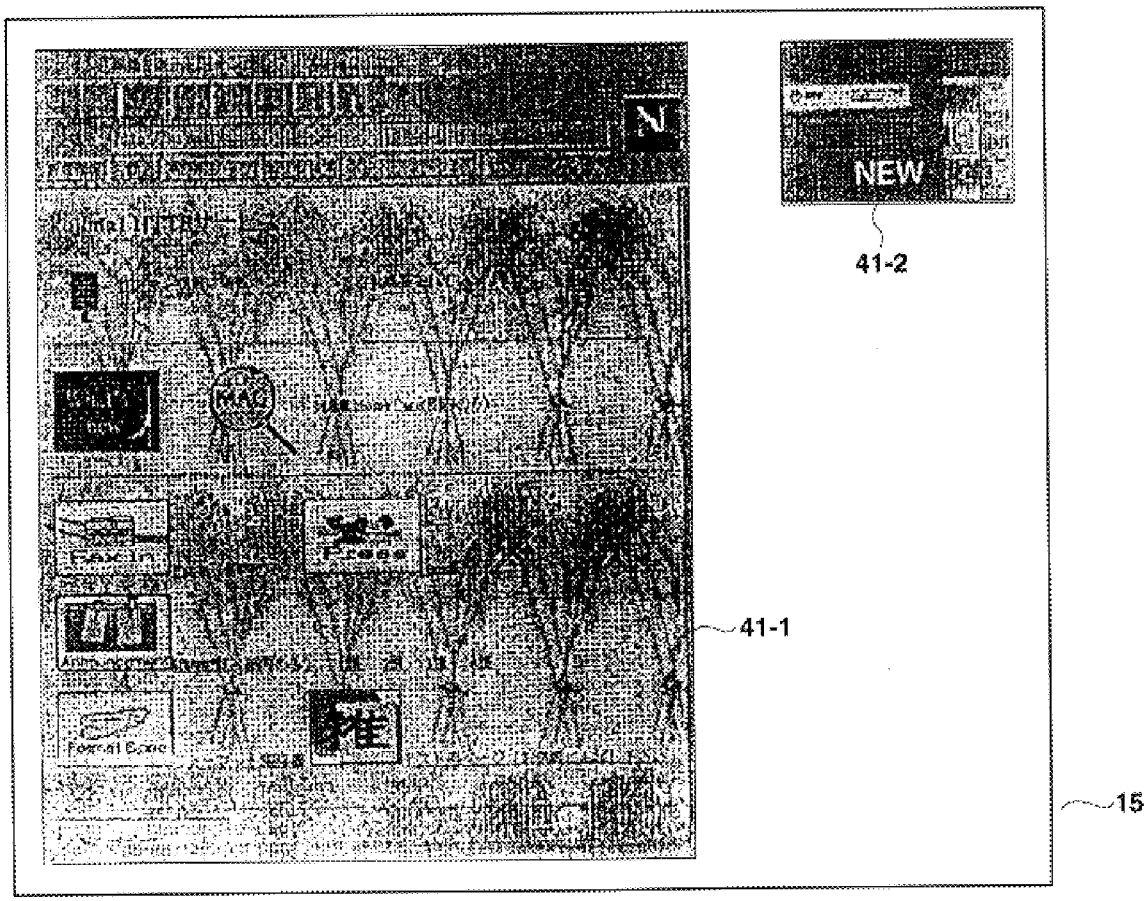
FIG. 19 is a view showing a specific examples of display corresponding to the example of display in FIG. 9.

FIG. 19 shows a more specific view of what is displayed in the display window of the display 15 showing the updating conditions carried out in this way.

Here, in the reduced display of the window 41-2 shown in FIGS. 9, 10 and 19, if the reduced image of the home page designated by the cursor 61 is expanded in the horizontal direction so as to be displayed as a reduced image with equal length and width, the user becomes able to confirm and outline any file.

According to the information management device and the information management method of the present invention, a determination is made as to whether or not a file has been updated by accessing a present address and an image is displayed so as to show the update status of the file corresponding to the determination results. Thus, whether or not a noted file has been updated can be made known in a rapid and reliable manner without putting a load on the file provider.

What is claimed is:

1. An information management device, comprising:
   setting means for setting an address of a file to be monitored;
   access means for accessing said address set by said setting means at a prescribed timing;
   determining means for determining update status of said file; and
   control means for controlling the display of an image displaying said update status of said file in accordance with determination results such that when said determining means determines that said update status indicates that the data of said file to be monitored is updated said control means controls said updated file for display in a window.

2. The device of claim 1, wherein said determining means comprises:
   storage means for storing the update time at the time of past accesses of said file; and
   comparing means for comparing the update time stored in said storage means with an update time at the time of a previous access of said file.

3. The device of claim 1, wherein said determining means comprises:
   storage means for storing a computed value obtained from computation with a hash function using data for said file at the time of a past access; and
   comparing means for comparing said computed value stored in said storage means with a computed value obtained from computation with the hash function using data for said file at the time of said previous access.

4. The device of claim 1, wherein said setting means sets a plurality of files as said files to be accessed.

5. The device of claim 1, wherein said setting means further sets a timing of accessing said file.

6. The device of claim 1, wherein said control means controls the display such that a compressed image of an image for said file is an image showing said update status of said file.

7. The device of claim 1, wherein said control means provides a plurality of compressed images in one window respectively displaying update status for a plurality of files, and changes the rate of image compression for updated files from that for nonupdated files.

8. The device of claim 1, wherein said control means provides a plurality of images in one window respectively displaying update status for a plurality of files, and changes the color for updated files from that for nonupdated files.

9. The device of claim 1, wherein said control means adopts an error image when problem involving accessing said file occurs.

10. The device of claim 1, wherein said access means starts to access said file when an image showing said update status of said file is designated.

11. An information management method, comprising the steps of:

setting an address for each of a plurality of files to be monitored, each of said files corresponding to a respective home page;

accessing said addresses in accordance with a predetermined timing;

determining the updating of said files; and controlling the image display for displaying, in a single window, a plurality of compressed images corresponding to said home pages of said files to be monitored;

wherein said step of controlling the image display includes the step of decompressing one of said compressed images corresponding to one of said files determined to be updated by said determining step.

12. The method of claim 11 wherein said step of determining includes the steps of:

storing the update time at the time of past accesses of said files; and comparing the update time stored with an update time at the time of a previous access of said files.

13. The method of claim 11 wherein said step of determining includes the steps of:

storing a computed value obtained from computation with a hash function using data for said files at the time of a past access; and comparing said stored computed value with a computed value obtained from computation with the hash function using data for said files at the time of said previous access.

14. The method of claim 13 wherein said step of setting further sets a timing of accessing said files.

15. The method of claim 14 wherein said step of controlling further includes the step of providing said plurality of compressed images in said single window respectively displaying the update status for said plurality of files, and changing the rate of image compression for updated files from that for nonupdated files.

16. An apparatus for managing information management, comprising:

a setter for setting an address for each of a plurality of files to be monitored, each of said files corresponding to a respective home page;

an accessor for accessing said addresses in accordance with a predetermined timing;

a determiner for determining the updating of said files; and a controller for controlling the image display for displaying, in a single window, a plurality of compressed images corresponding to said home pages of said files to be monitored;

wherein said controller is configured to decompress one of said compressed images corresponding to one of said files determined to be updated by said determiner.

17. The apparatus of claim 16 wherein said determiner further includes:

a memory for storing the update time at the time of past accesses of said files; and a comparer for comparing the update time stored with an update time at the time of a previous access of said files.

18. The apparatus of claim 16 wherein said determiner includes:

a memory for storing a computed value obtained from computation with a hash function using data for said files at the time of a past access; and a comparer for comparing said stored computed value with a computed value obtained from computation with the hash function using data for said files at the time of said previous access.

19. The apparatus of claim 18 wherein said setter is further configured to set a timing of accessing said files.

20. The apparatus of claim 19 wherein said controller is further configured to provide said plurality of compressed images in said single window respectively displaying the update status for said plurality of files, and further, to change the rate of image compression for updated files from that for nonupdated files.

* * * * *